(12) United States Patent
Wakatsuki (10) Patent No.: US 10,882,392 B2
(45) Date of Patent: Jan. 5, 2021

(54) FUEL CELL SYSTEM

(71) Applicant: Toyota Jidosha Kabushiki Kaisha, Toyota (JP)

(72) Inventor: Kazutoshi Wakatsuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 82 days.

(21) Appl. No.: 16/427,432

(22) Filed: May 31, 2019

(65) Prior Publication Data

US 2020/0009960 A1    Jan. 9, 2020

(30) Foreign Application Priority Data

Jul. 4, 2018    (JP) ................................. 2018-127787

(51) Int. Cl.
| | |
|---|---|
| *B60K 11/04* | (2006.01) |
| *H01M 8/04119* | (2016.01) |
| *F25B 19/04* | (2006.01) |
| *B60S 1/48* | (2006.01) |

(52) U.S. Cl.
CPC ................ *B60K 11/04* (2013.01); *B60S 1/48* (2013.01); *F25B 19/04* (2013.01); *H01M 8/04156* (2013.01); *B60Y 2400/202* (2013.01); *H01M 2250/20* (2013.01)

(58) Field of Classification Search
CPC ......... H01M 8/04156; H01M 2250/20; H01M 8/04014; H01M 8/04029; B60Y 2400/202; Y02E 60/50; B60L 50/72
See application file for complete search history.

(56) References Cited

U.S. PATENT DOCUMENTS

2004/0018405 A1* 1/2004 Vuk ........................ F28C 3/08
429/439
2010/0279191 A1* 11/2010 Matsuura ............ H01M 8/0662
429/443

FOREIGN PATENT DOCUMENTS

| JP | H07-279669 A | 10/1995 |
|---|---|---|
| JP | 2001-357864 A | 12/2001 |
| JP | 2002-372385 A | 12/2002 |
| JP | 2017-128197 A | 7/2017 |

\* cited by examiner

*Primary Examiner* — Stewart A Fraser
(74) *Attorney, Agent, or Firm* — Dinsmore & Shohl LLP (57) ABSTRACT

A pipe of a fuel cell system includes a pipe, one end side of which is connected to a fuel cell stack, and another end side of which is positioned adjacent to a vehicle structural component, through which water, and discharge air of a product that contains water vapor, which are produced by the fuel cell stack, flow; and a spray portion that is provided on the other end side of the pipe, and that sprays the water and the discharge air flowing through the pipe onto the vehicle structural component.

8 Claims, 6 Drawing Sheets

FUEL CELL SYSTEM

CROSS-REFERENCE TO RELATED APPLICATION

This application is based on and claims priority under 35 USC 119 from Japanese Patent Application No. 2018-127787 filed on Jul. 4, 2018, the disclosure of which is incorporated by reference herein.

BACKGROUND

Technical Field

The present disclosure relates to a fuel cell system.

Related Art

A structure provided with a radiator that performs a heat exchange on a coolant that is used to cool down a fuel cell is disclosed in Japanese Unexamined Patent Application (JP-A) No. 2001-357864. In the structure described in JP-A No. 2001-357864, water is recovered by introducing a fuel gas that contains water vapor produced inside the fuel cell into a condenser. The recovered water is then sprayed into the radiator so as to accelerate the heat exchange in the radiator.

However, in JP-A No. 2001-357864, a liquid feeder device such as a pump or the like is required in order to spray the recovered water onto the radiator, and there is a possibility that this will lead to an increase in power consumption.

SUMMARY

The present disclosure provides a fuel cell system that may inhibit any increase in power consumption.

A first aspect of the present disclosure is a fuel cell system including a pipe, one end side of which is connected to a fuel cell stack, and another end side of which is positioned adjacent to a vehicle structural component, through which water, and discharge air of a product that contains water vapor, which are produced by the fuel cell stack, flow; and a spray portion that is provided on the other end side of the pipe, and that sprays the water and the discharge air flowing through the pipe onto the vehicle structural component.

In the fuel cell system of the first aspect, one end side of a pipe is connected to a fuel cell stack, while another end side of the pipe is positioned adjacent to a vehicle structural component. In addition, water and discharge air of a product that contains water, and discharge air of a product that contains water vapor, which are produced by the fuel cell stack, flow through the pipe. Furthermore, a spray portion is provided on the other end side of the pipe, and the water and the discharge air flowing through the pipe are sprayed from this spray portion onto the vehicle structural component. In this way, because water vapor is flowing through the pipe, it may spray water from the spray portion onto the vehicle structural component using the pressure of this discharge air. As a result, water may be sprayed onto the vehicle structural component without a liquid feeder device for pumping out the water in the pipe interior being required.

A second aspect of the present disclosure is a fuel cell system including a retention tank in which water, and discharge air of a product that contains water vapor, which are produced by a fuel cell stack, are retained; a liquid feeder pipe, one end side of which is connected to the retention tank, and another end side of which is positioned adjacent to a vehicle structural component, through which water from inside the retention tank flows; a spray portion that is provided on the other end side of the liquid feeder pipe, and that sprays the water flowing through the liquid feeder pipe onto the vehicle structural component; an exhaust pipe that expels the discharge air from inside the retention tank; and a valve that opens and closes the exhaust pipe.

In the fuel cell system of the second aspect, there is provided a retention tank in which are retained water and discharge air of a product that contains water vapor produced in a fuel cell stack. One end side of a liquid feeder pipe is connected to this retention tank, and water flows through the liquid feeder pipe. Another end side of the liquid feeder pipe is positioned adjacent to a vehicle structural component, and a spray portion is provided on this other end side. Furthermore, an exhaust pipe that expels discharge air from inside the retention tank is also provided, and this exhaust pipe is opened and closed by a valve. As a consequence, if the valve is fully opened, a low pressure may be maintained inside the retention tank, and water produced by the fuel cell stack may be retained inside the retention tank. If the valve is then closed from this fully opened state, the pressure inside the retention tank increases. Because of this, water inside the liquid feeder pipe is sprayed from the spray portion onto the vehicle structural component. In this way, water may be sprayed onto the vehicle structural component without a liquid feeder device for pumping out the water inside the pipe being required. In addition, water may be sprayed onto the vehicle structural component at desired timings.

In a third aspect of the present disclosure, in the second aspect, the exhaust pipe may open towards the vehicle structural component.

In the fuel cell system of the third aspect, by opening a valve, discharge air may be blown from the exhaust pipe towards the vehicle structural component.

In a fourth aspect is of the present disclosure, in the second aspect, the exhaust pipe may extend towards a vehicle rear side from the retention tank, and the discharge air flowing through the exhaust pipe may be expelled towards the vehicle rear side.

In a fifth aspect is of the present disclosure, in any one of the first through third aspects, the vehicle structural component may be a heat exchanger that is provided at a front portion of a vehicle.

In the fuel cell system of the fifth aspect, water and discharge air are sprayed onto a heat exchanger provided in a front portion of a vehicle. Moreover, the quantity of heat discharged by the heat exchanger may be increased by evaporation heat from water that has adhered to the heat exchanger. Additionally, in a structure in which discharge air is sprayed onto a heat exchanger, the airflow rate and airflow speed of the air flowing onto the heat exchanger are increased, so that the heat exchange may be accelerated.

In a sixth aspect is of the present disclosure, in any one of the first through third aspects, the vehicle structural component may be a camera that is provided at a front portion of a vehicle.

BRIEF DESCRIPTION OF THE DRAWINGS

Exemplary embodiments of the present disclosure will be described in detail based on the following figures, wherein.

DETAILED DESCRIPTION

First Exemplary Embodiment

A fuel cell system according to a first exemplary embodiment will now be described with reference to the drawings. Note that an arrow FR and an arrow UP that are illustrated in the appropriate drawings respectively indicate a vehicle forward direction and a vehicle upward direction. Hereinafter, if front-rear, up-down, or left-right directions are used in the following description, then, unless specifically stated otherwise, these refer respectively to the front-rear directions of the vehicle, the up-down directions of the vehicle, and the left-right directions in the vehicle width direction when the vehicle is facing in a direction of forward travel.

Figure 1:
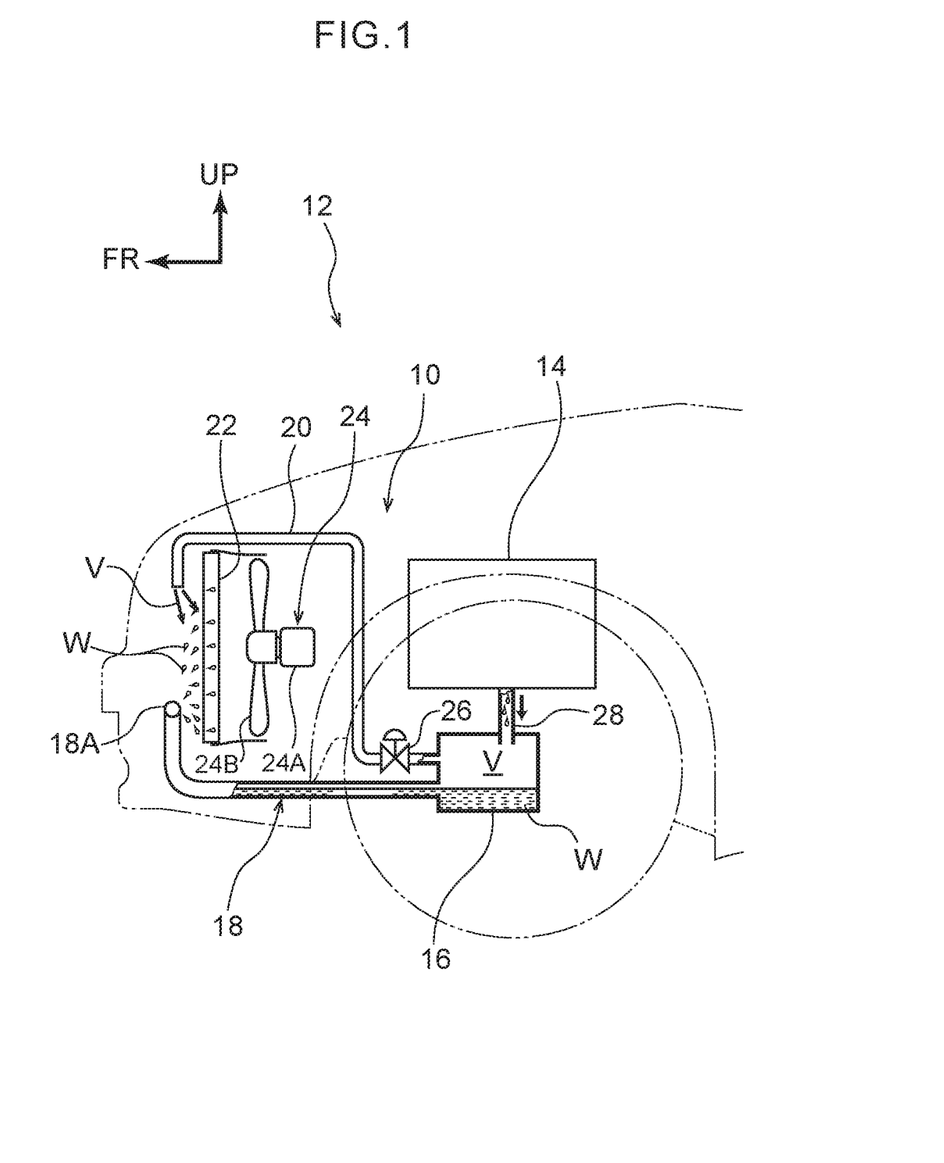
FIG. 1 is a schematic side view illustrating principal portions of a fuel cell system according to a first exemplary embodiment.

As is illustrated in FIG. 1, a fuel cell system 10 according to the present exemplary embodiment is provided in a front portion of a vehicle 12. The fuel cell system 10 is formed so as to include as principal portions a fuel cell stack 14, a retention tank 16, a liquid feeder pipe 18, an exhaust pipe 20, and a pressure regulating valve 26 that is serving as a valve.

The fuel cell stack 14 of the present exemplary embodiment is a battery that generates power when supplied with hydrogen and air. More specifically, the fuel cell stack 14 is provided with a plural of cells, and power is generated when hydrogen flows between a positive electrode (i.e., an anode, a fuel electrode) of the cells and a positive-electrode side separator, and air that contains oxygen flows between a negative electrode (i.e., a cathode, an air electrode) of the cells and a negative-electrode side separator. Furthermore, a motor is driven as a result of power being supplied from the fuel cell stack 14 to the motor.

At this time, because the fuel cell stack 14 generates heat, a structure is employed in which cooling water is supplied to the interior of the fuel cell so as to absorb the heat generated by the fuel cell stack 14. Additionally, in conjunction with the power generated by the fuel cell stack 14, water and discharge air of a product that contains water vapor are also produced.

The retention tank 16 is disposed on a vehicle lower side of the fuel cell stack 14. The retention tank 16 of the present exemplary embodiment is formed having a substantially rectangular shape when looked at in a side view, and this retention tank 16 is connected to the fuel cell stack 14 via a connecting pipe 28. A product that contains water W and discharge air V produced by the fuel cell stack 14 flows though the connecting pipe 28 and is retained in the retention tank 16. At this time, because heat is being released from the surface of the retention tank 16, the temperature of the discharge air V inside the retention tank 16 is lowered so that the discharge air V forms condensation, and a portion of the discharge air V changes to water W and is retained in the retention tank 16.

Two aperture portions located respectively on an upper side and on a lower side are formed in a side surface on the vehicle front side of the retention tank 16. One end side (i.e., a vehicle rear side) of the liquid feeder pipe 18 is connected to the lower side aperture portion, and the liquid feeder pipe 18 extends from the retention tank 16 towards the vehicle front side. Another end side (i.e., a vehicle front side) of the liquid feeder pipe 18 is positioned adjacent to a radiator 22, which is an example of a heat exchanger that is serving as a vehicle structural component. More specifically, the other end side of the liquid feeder pipe 18 extends onto the vehicle front side of the radiator 22, and from there is bent towards the vehicle upper side. The water W inside the retention tank 16 flows into this liquid feeder pipe 18.

Here, a spray portion 18A is provided at the other end portion of the liquid feeder pipe 18. The spray portion 18A is positioned on the vehicle front side of the radiator 22, and is provided with a nozzle (not illustrated in the drawings). This nozzle faces towards the radiator 22, and a structure is employed in which the water W flowing through the liquid feeder pipe 18 is sprayed from the spray portion 18A onto the radiator 22.

The exhaust pipe 20 is provided on the vehicle upper side of the liquid feeder pipe 18, and one end side (i.e., a vehicle rear side) of the exhaust pipe 20 is connected to an upper portion of the retention tank 16. The exhaust pipe 20 extends towards the vehicle front side from the retention tank 16, and then extends further towards the vehicle upper side. The exhaust pipe 20 then extends towards the vehicle front side on the vehicle upper side of the radiator 22, and the other end side (i.e., the vehicle front side) of the exhaust pipe 20 opens towards the radiator 22. In other words, the exhaust pipe 20 is laid so as to detour around the radiator 22 on the vehicle upper side thereof. Additionally, a structure is employed in which the discharge air V inside the retention tank 16 flows through the exhaust pipe 20, and the discharge air V that has flowed through the exhaust pipe 20 is expelled towards the radiator 22.

The pressure regulating valve 26 is provided at one end portion of the exhaust pipe 20, and the exhaust pipe 20 may be opened and closed by this pressure regulating valve 26. In addition, a structure is created in which the pressure regulating valve 26 is electrically connected to a control unit of the vehicle 12 (not illustrated in the drawings), so that the pressure regulating valve 26 is able to regulate the opening angle of the exhaust pipe 20.

The radiator 22 is disposed in a front portion of the vehicle, and a cooling water circulation path (not illustrated in the drawings) through which cooling water is circulated between the radiator 22 and the fuel cell stack 14 is connected to the radiator 22. The fuel cell stack 14 is cooled as a result of the cooling water circulating between the radiator 22 and the fuel cell stack 14.

An electric fan 24 is disposed on the vehicle rear side of the radiator 22. The electric fan 24 is provided with a motor 24A that is driven upon being supplied with power, and plural of rotating blades 24B that are joined to a drive shaft of the motor 24A. When electric power is supplied to the motor 24A, the rotating blades 24B are rotated, and an airflow that travels from the vehicle front side through the radiator 22 towards the vehicle rear side is generated.

Here, operations of the fuel cell system 10 that correspond to the opening angle of the pressure regulating valve 26 will be described. Firstly, when the pressure regulating valve 26 is fully open, discharge air V produced by the fuel cell stack 14 and fed to the retention tank 16 flows through the exhaust pipe 20 and is expelled onto the radiator 22. In contrast, water W produced by the fuel cell stack 14 is retained in the retention tank 16. At this time, because the discharge air V is expelled from the exhaust pipe 20, there is no increase in the pressure inside the retention tank 16, and the water W retained in the retention tank 16 is not sprayed from the spray portion 18A.

Next, when the pressure regulating valve 26 is fully closed, because the discharge air V is not flowing to the exhaust pipe 20, the pressure inside the retention tank 16 increases. As a result, the water W and discharge air V retained in the retention tank 16 are pushed into the liquid feeder pipe 18, and are then sprayed from the spray portion 18A onto the radiator 22.

When the pressure regulating valve 26 is in a state partway between the fully open state and the fully closed state, namely, is in a half open state, the water W is sprayed from the spray portion 18A of the liquid feeder pipe 18 onto the radiator 22, and the discharge air V is also expelled from the exhaust pipe 20 onto the radiator 22. This state is illustrated in FIG. 1.

(Operation)

Explanation follows regarding operation of the present exemplary embodiment.

In the fuel cell system 10 of the present exemplary embodiment, by spraying the water W produced by the fuel cell stack 14 onto the radiator 22, the quantity of heat discharged from the radiator 22 may be increased by the evaporation heat from the water W that has stuck to the radiator 22. As a result, a heat exchange may be performed efficiently compared to a structure in which water is not sprayed onto the radiator 22.

Moreover, in the present exemplary embodiment, the water W is sprayed from the spray portion 18A of the liquid feeder pipe 18 onto the radiator 22 using pressure provided by the discharge air V. As a consequence, it is possible to spray the water W onto the radiator 22 without a liquid feeder device such as a pump, or the like for pumping, out the water W inside the liquid feeder pipe 18 being required. In other words, because it is no longer necessary for power to be supplied to a liquid feeder device, an increase in the amount of power consumption may be inhibited.

Furthermore, in the present exemplary embodiment, by adjusting the aperture angle of the pressure regulating valve 26, the water W and discharge air V may be sprayed onto the radiator 22 at desired timings. For example, during normal traveling, the pressure regulating valve 26 is placed in a state close to either a fully open state or a fully closed state, and a heat exchange is accelerated by blowing the discharge air V onto the radiator 22 while the water W is accumulating in the retention tank 16. When a greater cooling performance is necessary, such as when the vehicle is traveling at low speed under a high load, then by placing the pressure regulating valve 26 in a state close to a fully closed state, the water W retained in the retention tank 16 is sprayed onto the radiator 22 so that an even more efficient heat exchange may be promoted in the radiator 22.

Figure 2:
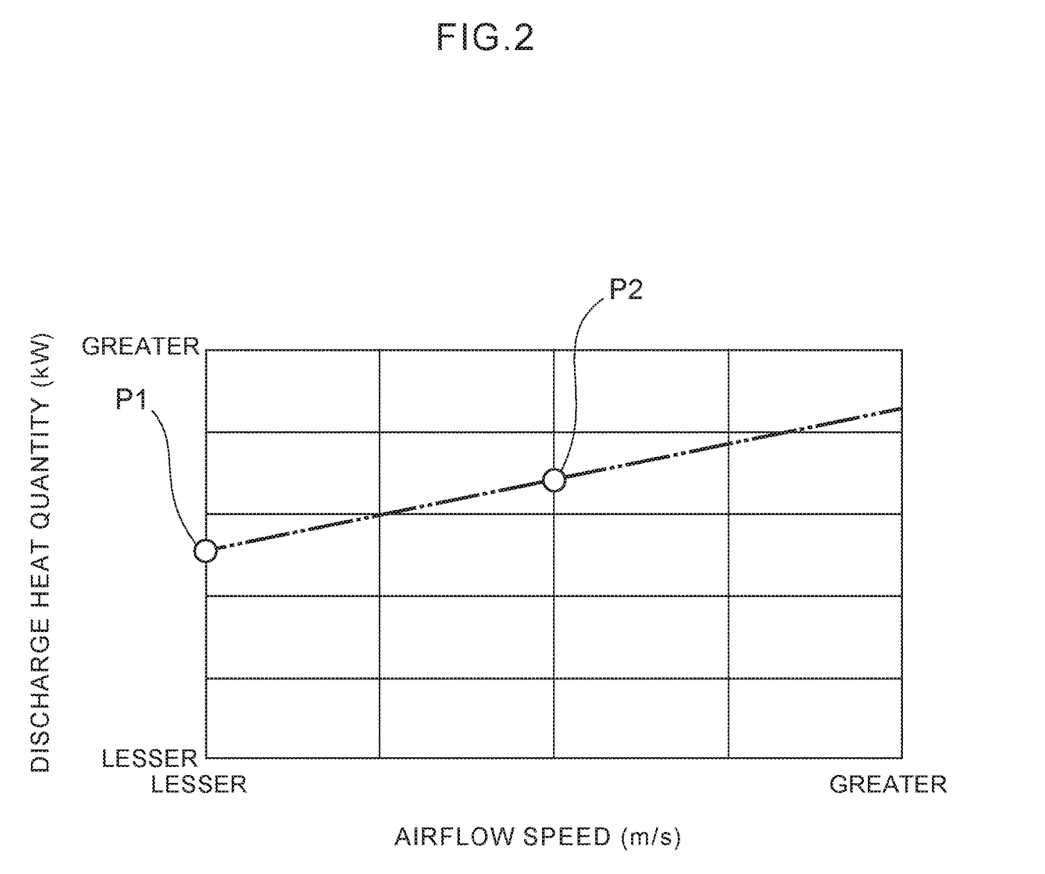
FIG. 2 is a graph illustrating a relationship between a quantity of heat discharged by a radiator and an airflow rate of a gas passing through the radiator.

Here, FIG. 2 shows a graph in which the horizontal axis represents an airflow rate of gas passing through the radiator 22, and the vertical axis represents the quantity of heat discharged from the radiator 22. From FIG. 2 it may be seen that the quantity of heat discharged from the radiator 22 increases proportionally as the airflow rate of gas passing through the radiator 22 increases. A point P1 illustrated in FIG. 2 is for a structure in which only the water W produced by the fuel cell stack 14 is sprayed onto the radiator 22. In other words, the point P1 is for a structure in which the discharge air V produced by the fuel cell stack 14 is not expelled onto the radiator 22, and is only expelled to the outside of the vehicle 12.

In contrast to this, a structure in which the discharge air V produced by the fuel cell stack 14 is expelled onto the radiator 22, as is the case in the present exemplary embodiment, is illustrated by a point P2 in FIG. 2. In other words, the quantity of gas that passes through the radiator 22 increases as a result of the discharge air V being blown onto the radiator 22. In addition, because the air in front of the radiator 22 is also captured by the discharge air V and made to pass through the radiator 22, the airflow speed of the gas passing through the radiator 22 is increased. Because of this, as is illustrated by the point P2 in FIG. 2, the quantity of heat discharged from the radiator 22 is increased compared with the structure used at the point P1.

Moreover, in the present exemplary embodiment, because a structure is employed in which the water W and discharge air V produced by the fuel cell stack 14 are retained in the retention tank 16, a portion of the discharge air V is condensed into water W by the discharge heat from the retention tank 16. In this way, the water W may be efficiently retained.

This point may be considered in comparison with a structure in which the discharge air V produced by the furl cell stack 14 is expelled to the outside of the vehicle. In a structure such as this, because the temperature of the fuel cell stack 14 becomes extremely hot during high-load traveling, no water W is produced, and only the discharge air V is produced. Accordingly, no water W is retained in the retention tank 16, and it may be difficult for a sufficient quantity of water W for cooling to be secured. In contrast to this, in a structure in which the discharge air V produced by the fuel cell stack 14 is retained in the retention tank 16, as is the case in the present exemplary embodiment, because water W may be accumulated by the condensation of the discharge air V, water W may be sprayed onto the radiator 22 even during high-load travel.

Figure 3:
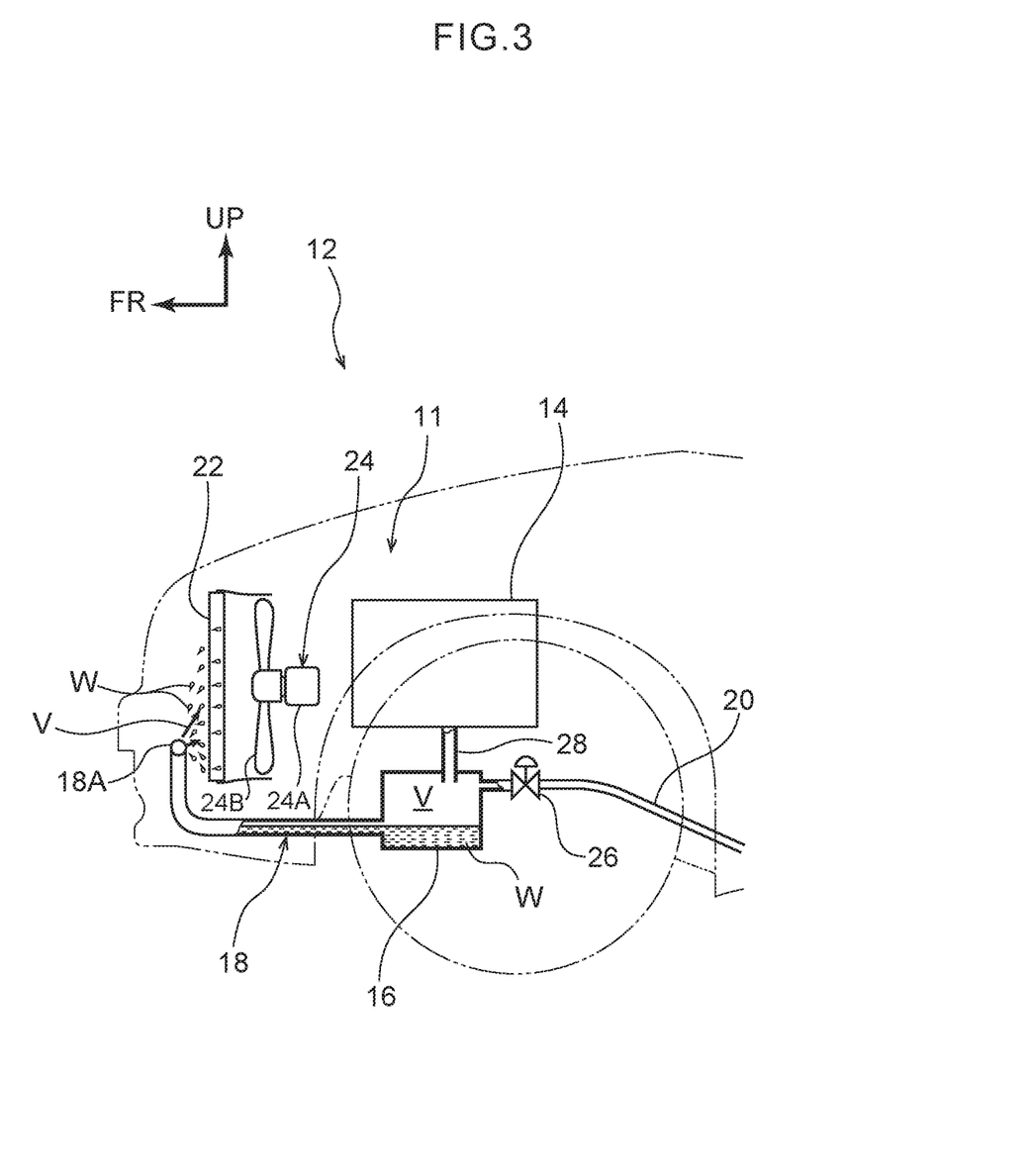
FIG. 3 is a schematic side view corresponding to FIG. 1 illustrating a variant example of the fuel cell system according to the first exemplary embodiment.

Note that, in the present exemplary embodiment, the exhaust pipe 20 is made to extend onto the vehicle front side of the radiator 22, however, the present disclosure is not limited to this and it is also possible to employ the structure of the variant example illustrated in FIG. 3.

Variant Example of the First Exemplary Embodiment

As is illustrated in FIG. 3, in a fuel cell system 11 of the present variant example, an aperture is formed in an upper portion of a side surface on the vehicle rear side of the retention tank 16, and the one end side (i.e., the vehicle front side) of the exhaust pipe 20 is connected to this aperture. The exhaust pipe 20 of the present variant example extends towards the vehicle rear side from the retention tank 16, and from there extends further alongside a lower surface of the vehicle 12 as far as the vehicle rear portion. The discharge air V that flows through the exhaust pipe 20 is thus expelled towards the vehicle rear side.

In the structure of the present variant example, by fully closing the pressure regulating valve 26 in the same way as in the first exemplary embodiment, the water W and discharge air V produced in the fuel cell stack 14 are sprayed from the spray portion 18A of the liquid feeder pipe 18 onto the radiator 22.

In contrast, when the pressure regulating valve 26 is fully open, the discharge air V flows through the exhaust pipe 20 and is expelled to the outside of the vehicle 12, while the water W produced in the fuel cell stack 14 is retained in the retention tank 16 and is not sprayed from the spray portion 18A.

As is described above, in the present variant example, if the pressure regulating valve 26 is fully opened, then neither the water W nor the discharge air V are sprayed onto the radiator 22. Because of this, by fully opening the pressure regulating valve 26 when, for example, the outside air temperature is extremely low, steam may be inhibited from rising from the vicinity of the radiator 22.

Second Exemplary Embodiment

Next, a fuel cell system 40 according to a second exemplary embodiment will be described with reference to FIG. 4. Note that structure that is the same as in the first exemplary embodiment is given the same descriptive symbol and any further description thereof is omitted.

Figure 4:
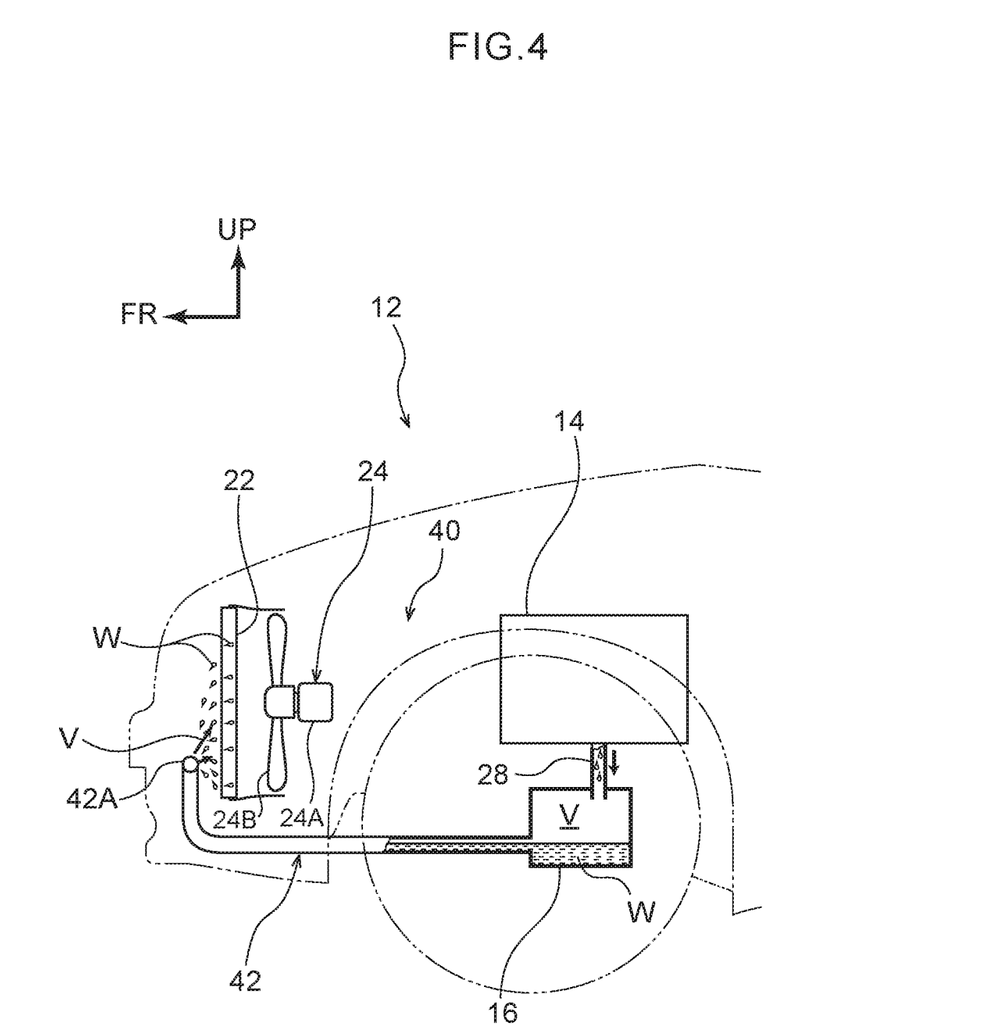
FIG. 4 is a schematic side view illustrating principal portions of a fuel cell system according to a second exemplary embodiment.

As is illustrated in FIG. 4, in the fuel cell system 40 according to the present exemplary embodiment, the retention tank 16 is disposed on the vehicle lower side of the fuel cell stack 14. In addition, an aperture portion is formed in the side surface on the vehicle front side of the retention tank 16, and one end side (i.e., the vehicle rear side) of a pipe 42 is connected to this aperture portion. The pipe 42 extends from the retention tank 16 towards the vehicle front side, and another end side (i.e., the vehicle front side) of the pipe 42 is positioned adjacent to the radiator 22. More specifically, the other end side of the pipe 42 extends onto the vehicle front side of the radiator 22, and from there is bent towards the vehicle upper side. The water W and discharge air V inside the retention tank 16 flow into this pipe 42.

A spray portion 42A is provided at the other end portion of the pipe 42. The spray portion 42A is positioned on the vehicle front side of the radiator 22, and is provided with a nozzle (not illustrated in the drawings). This nozzle faces towards the radiator 22, and a structure is employed in which the water W and discharge air V flowing through the pipe 42 are sprayed from the spray portion 42A onto the radiator 22.

As has been described above, the present exemplary embodiment differs from the first exemplary embodiment in that both the water W and the discharge air V produced by the fuel cell stack 14 flow along the single pipe 42.

(Operation)

Explanation follows regarding operation of the present exemplary embodiment.

In the fuel cell system 40 of the present exemplary embodiment, because both the water W and the discharge air V produced by the fuel cell stack 14 flow along the single pipe 42 and are sprayed onto the radiator 22 from the spray portion 42A, there is no need to provide a separate exhaust pipe. In other words, the quantity of heat discharged from the radiator 22 may be increased by a simple structure. The remaining action is the same as in the first exemplary embodiment.

Figure 5:
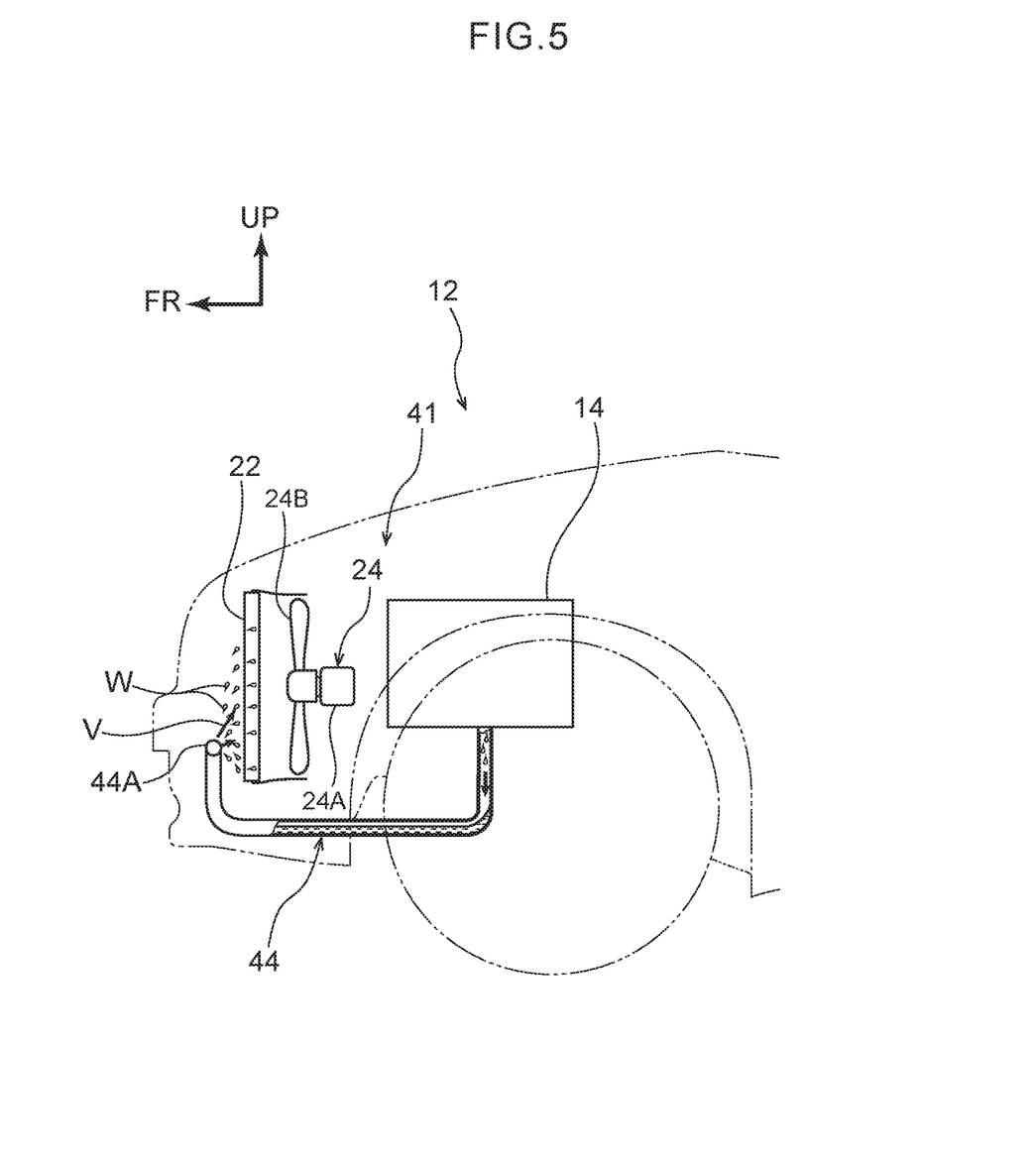
FIG. 5 is a schematic side view corresponding to FIG. 4 illustrating a variant example of the fuel cell system according to the second exemplary embodiment.

Note that, in the present exemplary embodiment, the retention tank 16 is disposed on the vehicle lower side of the fuel cell stack 14, however, the present disclosure is not limited to this and it is also possible to employ the structure of the variant example illustrated in FIG. 5.

Variant Example of the Second Exemplary Embodiment

As is illustrated in FIG. 5, in a fuel cell system 41 of the first variant example, no retention tank 16 is disposed on the vehicle lower side of the fuel cell stack 14, and one end side (i.e., the vehicle rear side) of a pipe 44 is connected directly to the fuel cell stack 14.

The pipe 44 extends from the fuel cell stack 14 towards the vehicle lower side, and from there extends further towards the vehicle front side, and another end side (i.e., a vehicle front side) of the pipe 44 is positioned on the vehicle front side of the radiator 22. The water W and discharge air V inside the retention tank 16 flow into this pipe 42.

A spray portion 44A is provided at the other end portion of the pipe 44. The spray portion 44A is positioned on the vehicle front side of the radiator 22, and is provided with a nozzle (not illustrated in the drawings). This nozzle faces towards the radiator 22, and a structure is employed in which the water W and discharge air V flowing through the pipe 44 are sprayed from the spray portion 44A onto the radiator 22.

If water vapor produced by the fuel cell, stack 14 is able to form condensation even without a retention tank being provided, then the same type of action as that obtained from the first exemplary embodiment and the second exemplary embodiment may also be obtained by employing the structure of the present variant example.

Note that it is also possible to lower the temperature of the discharge air V inside the pipe 44 by extending the length of the pipe 44. Additionally, it is also possible to cause the discharge air V inside the pipe 44 to form condensation by providing fins or the like on the pipe 44 so as to accelerate the heat discharge.

Third Exemplary Embodiment

Next, a fuel cell system according to a third exemplary embodiment will be described with reference to FIG. 6. Note that structure that is the same as in the first exemplary embodiment is given the same descriptive symbol and any further description thereof is omitted.

Figure 6:
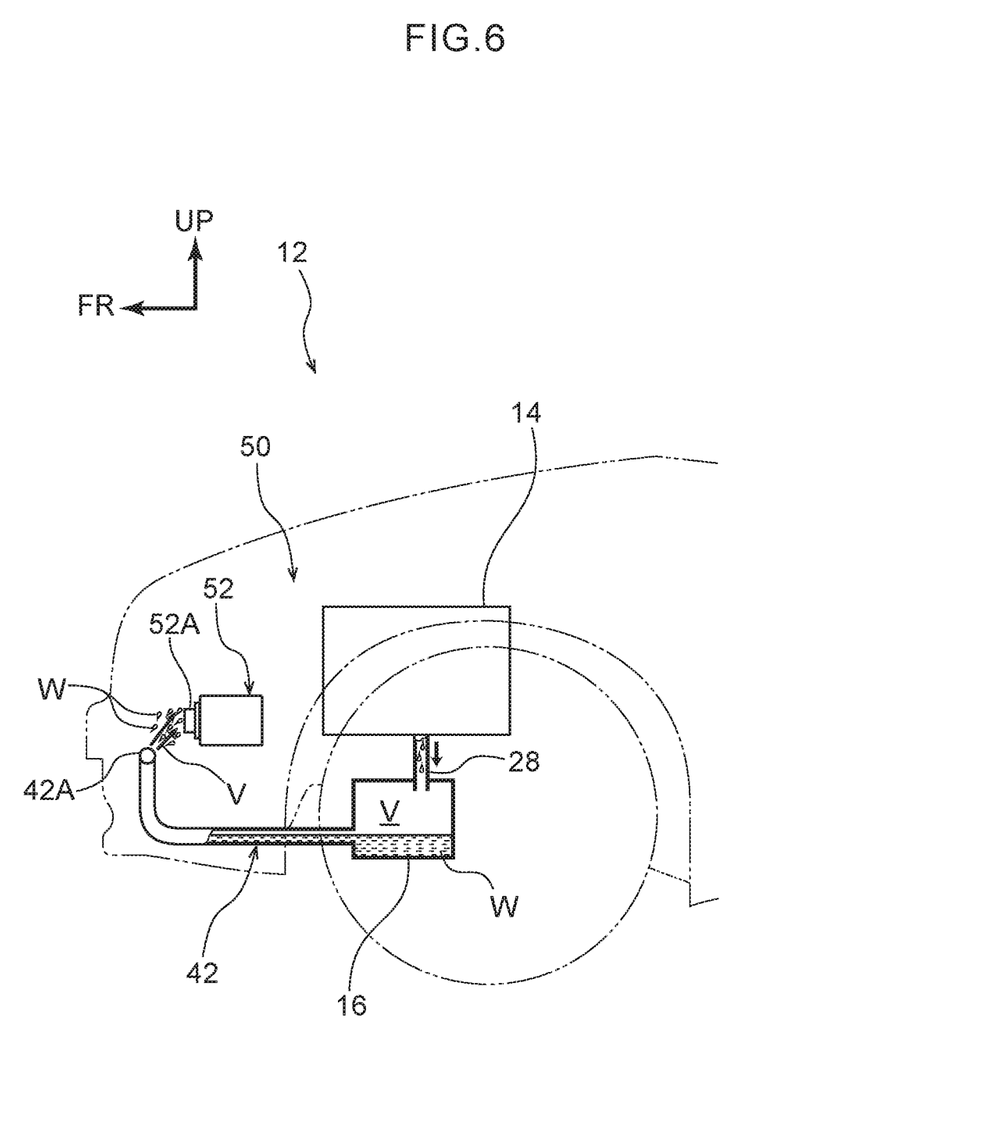
FIG. 6 is a schematic side view illustrating principal portions of a fuel cell system according to a third exemplary embodiment.

As is illustrated in FIG. 6, in a fuel cell system 50 according to the present exemplary embodiment, the object onto which the water W and discharge air V are sprayed is different from that of the second exemplary embodiment. More specifically, in the fuel cell system 50 according to the present exemplary embodiment, the retention tank 16 is disposed on the vehicle lower side of the fuel cell stack 14. One end side (i.e., the vehicle rear side) of the pipe 42 is connected to the retention tank 16, and the other end side (i.e., the vehicle front side) of the pipe 42 is positioned adjacent to a camera 52 that is serving as a vehicle structural component. More specifically, the other end side of the pipe 42 extends onto the vehicle front side of the camera 52, and from there is bent towards the vehicle upper side. The water W and discharge air V inside the retention tank 16 flow into this pipe 42.

The spray portion 42A is provided at the other end portion of the pipe 42. The spray portion 42A is positioned on the vehicle front side of the camera 52, and is provided with a nozzle (not illustrated in the drawings). This nozzle faces towards a lens 52A of the camera 52, and a structure is employed in which the water W and discharge air V flowing through the pipe 42 are sprayed from the spray portion 42A onto the lens 52A.

(Operation)

Explanation follows regarding operation of the present exemplary embodiment.

In the fuel cell system 50 of the present exemplary embodiment, the lens 52A of the camera 52 may be cleaned using the water W and the discharge air V produced by the fuel cell stack 14. As a consequence, there is no need to prepare a separate cleaning solution.

In addition, the water W and discharge air V may be sprayed from the spray portion 42A onto the lens 52A of the camera 52 by the pressure of the discharge air V that has been produced by the fuel cell stack 14. As a consequence, there is no need to provide a liquid feeder device such as a pump or the like. The remaining action is the same as in the first exemplary embodiment and the second exemplary embodiment.

A first exemplary embodiment through a third exemplary embodiment have been described above, however, it is to be understood that the present disclosure may be implemented in a variety of forms. For example, in the first exemplary embodiment and second exemplary embodiment, the object onto which the water W and discharge air V are sprayed is the radiator 22, while in the third exemplary embodiment, the object onto which the water W and discharge air V are sprayed is the lens 52A of the camera 52, however, the present disclosure is not limited to this. It is also possible to employ a structure in which the water W and discharge air V are sprayed onto an object that needs to be cooled such as a condenser. Additionally, it is also possible to employ a structure in which the water W and discharge air V are sprayed onto an object that needs to be cleaned such as a headlamp.

Furthermore, in the third exemplary embodiment, it is assumed that a modification is made to the structure of the second exemplary embodiment, however, the present disclosure is not limited to this. For example, a structure provided with the liquid feeder pipe 18 and the exhaust pipe 20, such as in the first exemplary embodiment illustrated in FIG. 1, may also be used in the third exemplary embodiment.

Exemplary embodiments of the present disclosure have been described and illustrated above, however, the present disclosure is not limited to these. Various modifications and the like may be made to the present disclosure insofar as they do not depart from the spirit or scope of the present disclosure.

What is claimed is:

1. A fuel cell system comprising:
   a pipe, one end side of which is connected to a fuel cell stack, and another end side of which is positioned adjacent to a vehicle structural component, through which water, and discharge air of a product that contains water vapor, which are produced by the fuel cell stack, flow; and
   a spray portion that is provided on the other end side of the pipe, and that sprays the water and the discharge air flowing through the pipe onto the vehicle structural component.

2. The fuel cell system according to claim 1, wherein the vehicle structural component is a heat exchanger that is provided at a front portion of a vehicle.

3. The fuel cell system according to claim 1, wherein the vehicle structural component is a camera that is provided at a front portion of a vehicle.

4. A fuel cell system comprising:
   a retention tank in which water, and discharge air of a product that contains water vapor, which are produced by a fuel cell stack, are retained;
   a liquid feeder pipe, one end side of which is connected to the retention tank, and another end side of which is positioned adjacent to a vehicle structural component, through which water from inside the retention tank flows;
   a spray portion that is provided on the other end side of the liquid feeder pipe, and that sprays the water flowing through the liquid feeder pipe onto the vehicle structural component;
   an exhaust pipe that expels the discharge air from inside the retention tank; and
   a valve that opens and closes the exhaust pipe.

5. The fuel cell system according to claim 4, wherein the exhaust pipe opens towards the vehicle structural component.

6. The fuel cell system according to claim 4, wherein:
   the exhaust pipe extends towards a vehicle rear side from the retention tank, and
   the discharge air flowing through the exhaust pipe is expelled towards the vehicle rear side.

7. The fuel cell system according to claim 4, wherein the vehicle structural component is a heat exchanger that is provided at a from portion of a vehicle.

8. The fuel cell system according to claim 4, wherein the vehicle structural component is a camera that is provided at a front portion of a vehicle.

* * * * *

UNITED STATES PATENT AND TRADEMARK OFFICE
CERTIFICATE OF CORRECTION

PATENT NO.       : 10,882,392 B2
APPLICATION NO.  : 16/427432
DATED            : January 5, 2021
INVENTOR(S)      : Kazutoshi Wakatsuki It is certified that error appears in the above-identified patent and that said Letters Patent is hereby corrected as shown below:

In the Specification

In Column 5, Line(s) 40, after "pump", delete ",".

In Column 5, Line(s) 40, after "pumping", delete ",".

In Column 6, Line(s) 28, delete "furl," and insert --fuel--, therefor.

In Column 8, Line(s) 18, after "fuel cell" delete ",".

In the Claims

In Column 10, Line(s) 40, Claim 7, delete "from" and insert --front--, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*